(No Model.)

G. M. DILLARD.
VEHICLE WHEEL.

No. 291,165. Patented Jan. 1, 1884.

WITNESSES
C. W. Dashiell
E. G. Siggers

INVENTOR
G. M. Dillard
by C. A. Snow & Co.
Attorneys

UNITED STATES PATENT OFFICE.

GREGORY M. DILLARD, OF MACON, MISSISSIPPI.

VEHICLE-WHEEL.

SPECIFICATION forming part of Letters Patent No. 291,165, dated January 1, 1884.

Application filed August 9, 1883. (No model.)

*To all whom it may concern:*

Be it known that I, GREGORY M. DILLARD, a citizen of the United States, residing at Macon, in the county of Noxubee and State of Mississippi, have invented a new and useful Vehicle-Wheel, of which the following is a specification, reference being had to the accompanying drawings.

This invention relates to improvements in wheels for vehicles, and has for its object the connecting or attaching of the spokes and fellies of the same, and also in the adjustment and tightening of the tires, when they become loosened, by means of a suitable nut and washer interposed between the ends of the spokes and fellies; and to this end the invention consists in the novel construction and arrangement of parts, as will be hereinafter more fully set forth.

Figure 1:
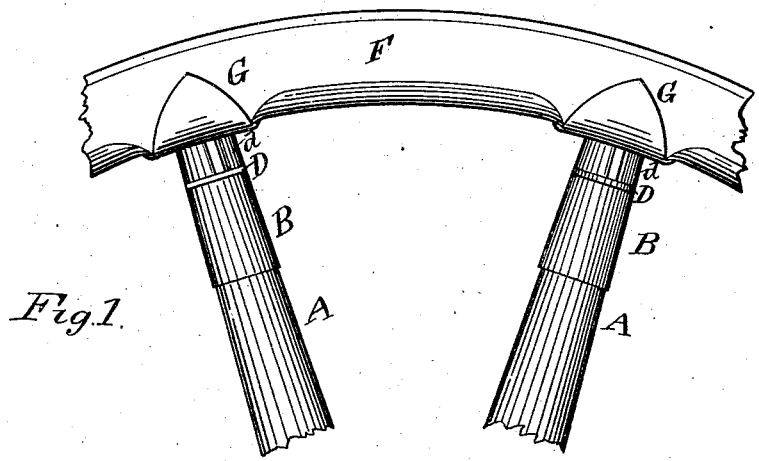
Figure 2:
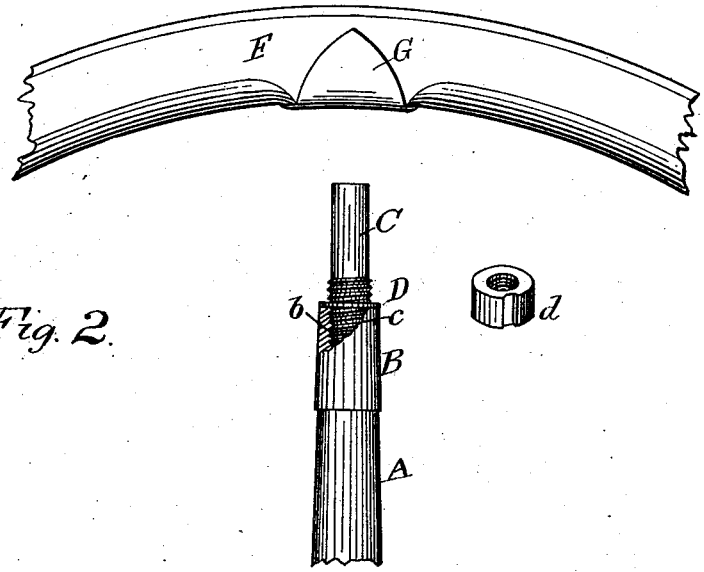

In the annexed drawings, Figure 1 represents a portion of a vehicle-wheel with two spokes embodying my improvement, and Fig. 2 is a side view of a portion of a felly and lower portion of a spoke, showing the parts in relative position before connection.

In the accompanying figures, A represents the spoke of a wheel, having a metallic hollow end piece or thimble, B, upon the end thereof, which connects with a felly. Upon the inside of this end piece or thimble are cut screw-threads $b$, for the reception of corresponding screw-threads, $c$, cut upon the inner or lower end of a bolt, C. This bolt C is provided with a suitable screw-threaded nut, $d$, the screw-threads of which receive also the screw-threads cut upon the lower end of the aforesaid bolt C.

D is a washer, made of leather or any other suitable material interposed between the metallic end of the spoke and the nut $d$, for a purpose hereinafter explained.

F represents a felly of the ordinary construction, provided with a perforation in the center thereof, and G is a metallic clip, also having a perforation therein, pivotally connected to the felly F on its under side by means of the bolt C passing through the same, this bolt C being clear of screw-threads the distance between the nut and clip, so that it will pass through the perforations above referred to.

It will be obvious from the foregoing description that the felly and spoke can be readily and expeditiously connected together, for the reason that there is only one bolt necessary for that purpose, and after the two are connected the clip on the felly preventing any splitting of the felly when it becomes necessary to adjust the spoke or felly in relation to each other when a tire becomes loose on the wheel and should be tightened, which is liable very often to be the case.

The adjustment of my device is as follows, viz: Where a tire becomes loosened, all that is necessary to tighten the same on the wheel is for the attendant to interpose between the end of the spoke and the nut upon the screw-threaded portion of the bolt a washer of suitable thickness, and then screw up the nut, which will force the bolt home in the felly, when the end of the bolt, with the necessary thickness of the washer, keeps the tire firmly upon the fellies and tightens the same.

The advantages of my improvement over those hitherto used are that it obviates all liability of the splitting of the fellies by the use of the clips over the spokes, and at the same time the ends of the spokes can be made much smaller, if necessary, than those ordinarily made, and will be considerably stronger, more durable, and cheaply manufactured.

I do not wish to be understood as limiting myself to the precise construction of my device, as the same may be varied, if desired, without departing from the spirit of my invention.

What I claim as new, and desire to secure by Letters Patent, is—

As an improvement in vehicle-wheels, the combination of the spokes, the metallic thimbles B, secured to the outer ends of the spokes and formed with internal screw-threads. $b$, the separate bolt C, having the screw-threaded portion $c$, that is received by the threads $b$, and the smooth cylindrical end portion, the nut $d$ on screw-threads $c$, the washer D, interposed between the end of the thimble and the nut, and the felly having the hole or perforation, all arranged and operating substantially as and for the purpose set forth.

In testimony that I claim the foregoing as my own I have hereto affixed my signature in presence of two witnesses.

GREGORY M. DILLARD.

Witnesses:
T. J. STOKES,
ROBERT C. PATTY.